United States Patent
Yamada et al.

(10) Patent No.: US 7,201,043 B2
(45) Date of Patent: Apr. 10, 2007

(54) COMBUSTION PRESSURE SENSOR AND GLOW PLUG INCLUDING THE SAME

(75) Inventors: Tatsunori Yamada, Aichi (JP); Yuichi Yamada, Gifu (JP); Nobuyuki Hotta, Aichi (JP)

(73) Assignee: NGK Spark Plug Co., Ltd. (JP)

( * ) Notice: Subject to any disclaimer, the term of this patent is extended or adjusted under 35 U.S.C. 154(b) by 0 days.

(21) Appl. No.: 11/394,022

(22) Filed: Mar. 30, 2006

(65) Prior Publication Data

US 2006/0218997 A1  Oct. 5, 2006

(30) Foreign Application Priority Data

Mar. 31, 2005 (JP) ............... 2005-105522
Feb. 13, 2006 (JP) ............... 2006-035868

(51) Int. Cl.
*G01M 15/00* (2006.01)

(52) U.S. Cl. .................... 73/115; 73/35.13

(58) Field of Classification Search .......... 73/112, 73/115, 116, 117.2, 117.3, 118.1, 119 R, 73/120, 35.01, 35.07, 35.12, 35.13, 40, 46, 73/47, 49.7

See application file for complete search history.

(56) References Cited

U.S. PATENT DOCUMENTS

| | | | |
|---|---|---|---|
| 6,979,801 B2 | 12/2005 | Okazaki et al. | 219/270 |
| 2004/0182144 A1* | 9/2004 | Okazaki et al. | 73/118.1 |
| 2004/0182145 A1* | 9/2004 | Okazaki et al. | 73/119 R |
| 2004/0261502 A1* | 12/2004 | Watarai et al. | 73/35.13 |
| 2005/0056087 A1* | 3/2005 | Kiess et al. | 73/116 |
| 2005/0061063 A1* | 3/2005 | Haussner et al. | 73/116 |
| 2006/0032472 A1* | 2/2006 | Yamada et al. | 123/145 A |
| 2006/0137655 A1* | 6/2006 | Dordet | 123/435 |

FOREIGN PATENT DOCUMENTS

| | | |
|---|---|---|
| DE | 10218544 | 11/2002 |
| EP | 0702229 | 3/1996 |
| EP | 1460404 | 9/2004 |
| EP | 1624249 | 2/2006 |
| JP | 2004163091 | 6/2004 |
| JP | 2004278932 | 10/2004 |

* cited by examiner

*Primary Examiner*—Eric S. McCall
(74) *Attorney, Agent, or Firm*—Kusner & Jaffe

(57) ABSTRACT

To provide a combustion pressure sensor capable of reducing noises generated by the force in a rocking direction by making uniform the stress exerted onto the piezoelectric element; and a glow plug having the same.

6 Claims, 12 Drawing Sheets

Raw waveform of combustion pressure sensor

COMBUSTION PRESSURE SENSOR AND GLOW PLUG INCLUDING THE SAME

FIELD OF THE INVENTION

The present invention relates to a combustion pressure sensor for sensing the change in the combustion pressure in an internal combustion engine, and a glow plug for assisting the start of an internal combustion engine, which glow plug integrally includes the combustion pressure sensor.

BACKGROUND OF THE INVENTION

A glow plug, for assisting the start of an internal combustion engine, is known which integrally includes a combustion pressure sensor for sensing a combustion pressure of an internal combustion engine. In such a glow plug, a heater member, that is disposed at a top end side thereof and that generates heat when energized, is exposed inside the internal combustion engine. The combustion pressure acting on the heater member is transmitted to a piezoelectric element (i.e., a pressure-sensing element) for sensing a combustion pressure via a center shaft. The piezoelectric element is accommodated in a cylindrical casing (housing) at a rear end side of the glow plug in a state where the piezoelectric element is pre-loaded (See, for example, Japanese Laid-Open Patent Publication No. 2004-278932).

The force based on the combustion pressure is transmitted to the piezoelectric element via the center shaft that extends in an axial direction of the glow plug, and thus acts in the axial direction of the glow plug. On the other hand, when the swinging generated by the vibration of the internal combustion engine itself, onto which the glow plug is assembled, causes the force containing the component in the perpendicular direction to the axis to be applied to the center shaft, a situation may arise where the center shaft is inclined relative to the axial direction of the glow plug and is vibrated. If this situation arises, a force in a direction different from the direction along which the piezoelectric element originally undergoes the influence of the combustion pressure is superimposed onto the force generated by the combustion pressure, and this superimposed force is applied to the piezoelectric element. There may be a case where this superimposed force produces a noise and exerts an influence on a sensor output.

In order to reduce the influence of noise such as described above, as is the case of Japanese Laid-Open Patent Publication No. 2004-278932, a sleeve with a flange (an outwardly protruding member) is integrally provided to the center shaft, and the center shaft is passed through the inner hole of a ring-shaped piezoelectric element, and the piezoelectric element is pre-loaded between the flange portion and the top-facing end surface of the inner wall of the case. In this manner, for example, even if a force in a rocking direction applies a force in a compressing direction to one side of the piezoelectric element that is partitioned therefrom by the plane perpendicular to the rocking direction, including an axis so as to generate a positive charge, whereas a force in a stretching direction opposite to the compressing direction is applied to the opposite side so as to generate a negative charge, the charges generated by the rocking direction are equal between one side and the other side partitioned from each other by said plane, so that they can compensate for each other. Thus, these charges can compensate for each other within the piezoelectric element, and as a result, only a force based on the combustion pressure can be detected.

However, the combustion sensor of the glow plug as described above has a structure in which a slit-like opening for taking out an output from the piezoelectric element is formed on a portion of its case, and the output is connected to the signal line outside the case so as to be electrically connected to the external circuit of the glow plug. As described above, the piezoelectric element is pre-loaded between the flange portion of the sleeve and the top end surface of the inner wall of the case. At the portion of the top end surface formed with the opening and at the portion of the same top end surface continued to the opening which is formed on the side wall of the case and extends from the axis toward the radial outward periphery, the case has low rigidity due to the presence of the opening. If the rigidity of the case is partially low, and thus the rigidity of the entire case is non-uniform, the pre-load exerted by the top end-facing end surface of the inner wall of the case to the piezoelectric element may also accordingly be non-uniform. In this case, when a force is applied in a rocking direction, there is a danger that a difference may arise in the absolute amounts of charges generated at one and the other sides of the piezoelectric element partitioned from each other by said plane, and that such a difference may cause noises.

The present invention has been made to solve the problems described above, and an objective thereof is to provide a combustion pressure sensor capable of reducing noises caused by force in a rocking direction, by making uniform the stress exerted on the piezoelectric element; and a glow plug including the same.

SUMMARY OF THE INVENTION

In order to achieve the objective described above, a combustion pressure sensor according to the invention recited in a first embodiment is a combustion pressure sensor for sensing a combustion pressure of an internal combustion engine, including: piezoelectric elements for sensing a change in stress exerted on themselves; a supporting portion for supporting said piezoelectric elements; pressure transmitting members having the shape of a bar extending in an axial direction, displaceable relatively in said axial direction with respect to said supporting portion as combustion pressure varies; a pressing portion for exerting a pre-load to compress said piezoelectric elements with said supporting portion interposed between said pressing portion and said supporting portion, said pressing portion displacing in said axial direction as said pressure transmitting members displace; and electrodes interposed between said supporting member and said pressing portion, for outputting a change in the stress sensed by said piezoelectric elements as an electric signal, wherein either one of said pressing member and said supporting portion is formed with: a first opening for taking out a signal line that establishes an electric connection between an external circuit and said electrodes; and at least one or more second openings that are different from said first opening.

Further, the combustion pressure sensor recited in a second embodiment is characterized insofar that, in addition to the structure of the invention recited in the first embodiment, when an image of a site of either one of said pressing member and said supporting portion that is formed with said first opening is projected onto a plane intersecting said axis and said projected image is viewed, said second opening is formed in an area which is opposed to the area formed with said first opening and is partitioned therefrom by a straight line containing said axis and intersecting a direction from said axis toward said first opening.

Further, the combustion pressure sensor of the invention recited in a third embodiment is characterized insofar that, in addition to the structure recited in the first embodiment, when an image of a site of either one of said pressing member and said supporting portion that is formed with said first opening is projected onto a plane intersecting said axis and said projected image is viewed, said first opening and said second opening are formed in such a manner that the site of either one of said pressing portion and said supporting portion formed with said first opening is bilaterally symmetrical, regardless of when a straight line passing through said axis and containing a direction from said axis toward said first opening is employed as a center, or when a straight line intersecting said straight line and passing through said axis is employed as a center.

Further, the combustion pressure sensor of the invention recited in a forth embodiment is characterized insofar that, in addition to the structure of the invention recited in the first embodiment, when an image of a site of either one of said pressing member and said supporting portion that is formed with said first opening is projected onto a plane intersecting said axis and said projected image is viewed, in a direction opposite a direction from said axis toward an arbitrary opening which is either one of said first opening and said second opening, an opening having the same shape as said opening and constituting a pair with said opening is formed.

Further, the glow plug of the invention recited in a fifth embodiment includes: a main metal fitting formed with an axial hole extending along an axis; a center shaft passed through said axial hole and held by said main metal fitting so as to be movable along said axial direction; a heater member that includes a heat generating body at its top end side and of which a rear end side is fixed to the top end of said center shaft; and said combustion pressure sensor according to any one of the first embodiment to the fourth embodiment, wherein said pressure transmitting members of said combustion pressure sensor constitutes said center shaft; said pressing portion is disposed at a rear end side of said center shaft; said supporting portion is disposed at a rear end side of said main metal fitting in a state where said supporting member accommodates within itself said pressing portion, said piezoelectric elements, and said electrodes; and said first opening and said second opening are formed in said supporting portion.

Further, the glow plug of the invention recited in a sixth embodiment includes: a main metal fitting formed with an axial hole extending along an axis; a center shaft passed through said axial hole and held by said main metal fitting so as to be movable along said axial direction; a heater member that includes a heat generating body at its top end side and of which a rear end side is fixed to the top end of said center shaft; and said combustion pressure sensor according to any one of the first embodiment to the fourth embodiment, wherein said supporting portion of said combustion pressure sensor is disposed at a rear end side of said main metal fitting; said pressure transmitting member constitutes said center shaft; said pressing portion is disposed at a rear end side of said center shaft in a state where said pressing member exerts a pre-load onto said piezoelectric element with said piezoelectric element interposed between said pressing portion and said supporting portion; and said pressing portion is formed with said first opening and said second opening.

As recited in the first embodiment, either one of the pressing portion and the supporting portion is formed with a second opening which is different from the first opening. As described above, if the first opening is formed in the pressing portion or the supporting portion, the rigidity of the pressing portion or the supporting portion may partially decrease due to the presence of the first opening, and a pre-load exerted on the piezoelectric elements may be non-uniform. If a force in a rocking direction is additionally exerted thereon, the absolute amount of the positive charge and the negative charge generated in one piezoelectric element and the other piezoelectric element, partitioned from each other by a plane containing an axis, differs from each other. However, due to the presence of the second opening, the absolute amounts can be equal to each other. Therefore, even if the combustion pressure sensor of the present invention receives a force in a rocking direction, it can still reduce the noise caused by the rocking.

When the second opening is formed as described above, as is recited in the second embodiment, the second opening is preferably formed in an area which is opposite to the area having the first opening in the pressing portion or the supporting portion and is partitioned therefrom by a straight line intersecting the direction from the axis toward the first opening and containing the axis. In this structure, the load applied to the piezoelectric element by the area formed with the first opening and the load applied to the piezoelectric element by the area formed with the second opening is balanced so as to be equal to each other. That is, when one of the areas has both a portion with low rigidity and a portion with high rigidity, the pre-load applied to the piezoelectric element be comes non-uniform in this area. Since the load in the area opposed to this area is also similarly made to be non-uniform, the absolute amounts of the positive and negative charges can be made to be equal in these areas. Therefore, even if rocking is applied to the combustion pressure sensor, the generation of noises caused by the rocking can be reduced.

As means for making the degree of the lowering in the rigidity of the case to be equal, the structure recited in the third embodiment may also be employed. The straight line passing through the axis and containing the direction from the axis toward the first opening, and the straight line intersecting said straight line and passing through the axis depict two straight lines intersecting on the axis on the plane where their images are projected. Since the case is structured to be bilaterally symmetrical with respect to both of these two straight lines, the degree of lowering in the rigidity of the case can be made to be uniformly equal to each other. Even if a force is applied from a rocking direction, the absolute amounts of the positive and negative charges that the applied force generates in the piezoelectric elements can still be equal to each other. Therefore, reduction of noises, or suppression of the generation of noise caused by rocking of the combustion pressure sensor, becomes possible.

Alternatively, the structure recited in the fourth embodiment may be employed. That is, in the case in which an image is projected onto a plane intersecting the axis, an arbitrary opening which is either one of the first opening or the second opening extending from the axis, and an opening which has the same shape as said opening and constitutes a pair with said opening on the opposite side of centered on the position of the axis are formed. In this manner, when the combustion pressure sensor is viewed at its arbitrary cross section containing the axis, the left and right portions of the piezoelectric element centered on the axis are as a result subjected to the same pre-load. Thus, the absolute amounts of the positive and negative charges generated in the piezoelectric elements by force in the rocking direction can be equal to each other. As a result, even if rocking is applied to the combustion pressure sensor, the generation of noises caused by the rocking can be reduced.

By the way, in the present invention, in the case where the site of the pressing member or the supporting portion which is formed with the first opening is projected on a plane intersecting the axis and the projected image is viewed, the area and the position where the first opening and the second opening are formed are defined. Such a definition is made merely for the purpose of convenience, and the first opening and the second opening are not necessarily required to be projected on the plane. That is, when the pressing portion or the supporting portion is viewed in the axial direction, the first opening and the second opening are not necessarily required to be formed at visible positions. Alternatively, the first opening and the second opening may be formed at a side surface of the pressing portion or the supporting portion.

In addition, the glow plug of the invention recited in the fifth embodiment includes a combustion pressure sensor in which a supporting portion is provided at a rear end side of the main metal fitting, and inside the supporting portion, a pressing member provided at a rear end side of the center shaft as a pressure transmitting member, piezoelectric elements, and electrodes are accommodated. Specifically, the pressing portion displaces as the center shaft displaces in accordance with the combustion pressure, and the pre-load applied to the piezoelectric element between the pressing portion and the supporting portion increases and decreases. The total amount of the positive or negative charge generated by the increase and decrease in the pre-load is obtained as a magnitude of the combustion pressure. By the way, the glow plug is directly mounted onto the internal combustion engine, and receives a rocking influence cased by vibration involved in the actuation of the internal combustion engine. By use of the combustion pressure sensor recited in either one of the first embodiment to the fourth embodiment as a combustion pressure sensor, the generation of the noise caused by the rocking can be reduced in a structure where the signal wire connected to the electrode accommodated in the supporting portion is taken out of the supporting portion via the first opening. As a result, the combustion pressure can be sensed with excellent sensitivity. Further, the glow plug assists ignition by use of the heater member exposed inside the combustion room. By employing a structure in which the center shaft is mechanically linked to the heater member and the change in stress caused by the combustion pressure to which the heater member has been subjected via the center shaft is sensed by the combustion sensor, there is no need to prepare either locations for assembling a heater for assisting ignition or a combustion pressure sensor. As a result, the internal combustion engine can be downsized.

On the other hand, the glow plug of the invention recited in the sixth embodiment includes a combustion pressure sensor structured so that the pre-load applied to the piezoelectric element between the supporting portion provided at the rear end side of the main metal fitting and the pressing portion provided at the rear end side of the center shaft decreases as the pressing portion displaces commensurately with the displacement of the center shaft according to the combustion pressure, and the amount of the charge generated at this time is obtained as the magnitude of the combustion pressure. Even in a structure such as this glow plug in which the first opening for taking out the signal wire is provided at the side of the pressing portion, the generation of noise caused by rocking can be reduced and the combustion pressure can be sensed with excellent sensitivity, as in the case described above. Then, as in the case described above, by employing a structure including the combustion pressure sensor and the heater for assisting ignition integrated into one piece unit, the internal combustion engine can be downsized.

DETAILED DESCRIPTION OF PREFERRED EMBODIMENT

Figure 1:
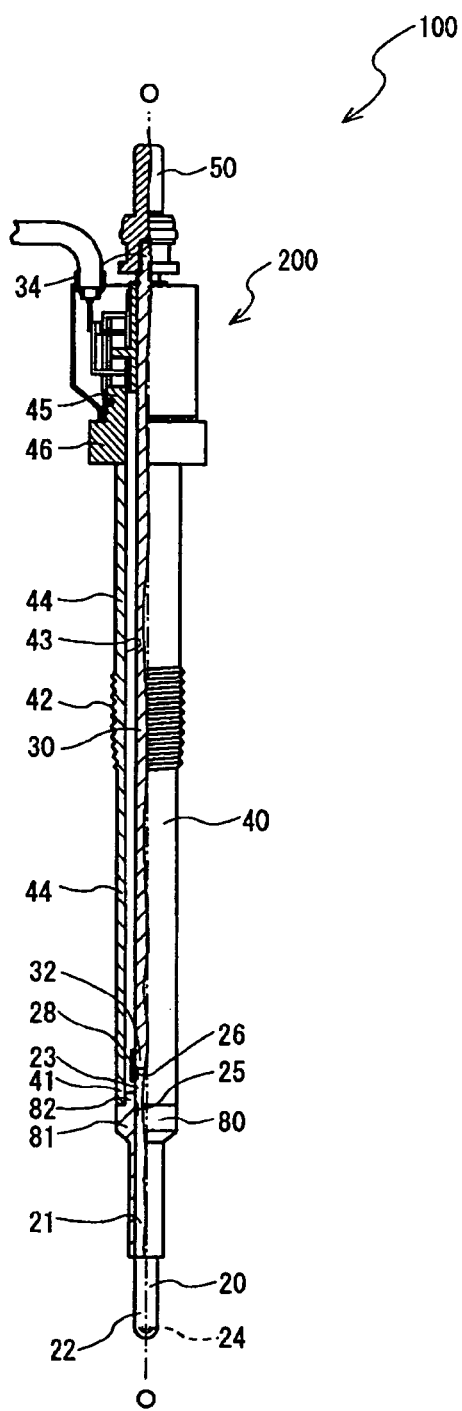
FIG. 1 is a partial cross-sectional view of a glow plug 100.

Referring now to the drawings wherein the showings are for the purpose of illustrating a preferred embodiment of the invention only, and not for the purpose of limiting same, FIG. 1 shows a glow plug 100, illustrating an embodiment of the present invention. FIG. 1 is a partial, cross-sectional view of the glow plug 100 showing an entire structure of a glow plug 100 of this embodiment. The description will be made on an assumption that, in the direction of an axis O, the side of glow plug 100 at which a ceramic heater 20 is disposed (a lower side in FIG. 1) is a top end side of the glow plug 100. In other words, the term "top" refers to a heating end side with respect to the axial direction of glow plug 100, and the term "rear" refers to a side opposite the top side.

As shown in FIG. 1, the glow plug 100 of this embodiment is mounted, for example, onto a combustion chamber (not shown) of a diesel engine, and is utilized as a heat source for assisting ignition at the time of engine start-up. At a top end side of a main metal fitting 40, a ceramic heater 20 is held in an axial direction O, and is mechanically connected with a center shaft 30 which is passed through an axial hole 43 of the main metal fitting 40. The ceramic heater 20 is designed to be exposed inside the combustion chamber. When receiving a force exerted by combustion pressure, this force is transmitted to a combustion pressure sensor 200 disposed at a rear end side (an upper side in FIG. 1) of the main metal fitting 40 via the center shaft 30.

The ceramic heater 20 is in the shape of a round bar, and has a structure in which a heat generating element 24 made of conductive ceramic is embedded in a base 21 made of insulating ceramic. Ceramic heater 20 has a top end portion 22 shaped into a curved surface. On an outer periphery at the rear end portion 23 of the ceramic heater 20, two electrodes 25, 26 for applying voltage to the heat generating element 24 are provided. Electrodes 25, 26 are spaced apart from each other in an axial direction. This ceramic heater 20 is held in a cylindrical cylinder body 80 in such a manner that the ceramic heater 20 is surrounded by the outer periphery of the main body of the cylindrical cylinder body 80.

The electrode 25, which is formed at a top end side, is in contact with the cylinder of the cylindrical body 80 and is electrically connected thereto. In contrast, the electrode 26 is not in contact with the cylindrical body 80 and is electrically insulated therefrom. The ceramic heater 20 corresponds to the "heater member" of the present invention, and the heat generating element 24 corresponds to the "heat generating body" of the present invention.

The cylindrical body 80 is made of a metallic member, and is formed with a thick flange portion 81 at its rear end side. At the rear end of the flange portion 81, a step-like engaging portion 82 is formed. An inner periphery of a top end portion 41 of a cylindrical main metal fitting 40 is engaged with the engaging portion 82. When the engagement is made, the shaft of the ceramic heater 20 and the shaft of the main metal fitting 40 coincide with the axis O. In this state, the portion of the ceramic heater 20 located at a position rearward from the cylindrical body 80 is accommodated in the main metal fitting 40, so that the main metal fitting 40 is positioned by the engaging portion 82 of the cylindrical body 80. In this manner, the electrode 26 provided at the rear end portion of the ceramic heater 20 is not in contact from the metallic main metal fitting 40.

The main metal fitting 40 is an elongated thin cylindrical metal fitting that defines an axial hole 43 that extends through fitting 40 in the direction of the axis O. At substantially the middle portion of the main body portion 44 thereof, a male screw portion 42 is formed. Screw portion 42 is used for mounting the glow plug 100 onto an engine head (not shown) of the internal combustion engine. The rear end of the main body portion 44 is formed with a tool engaging portion 46, that when viewed along the axis O, has a hexagonal cross section to which is engaged a tool to be used for mounting the glow plug 100 onto the engine head. At the rear end side of this tool engaging portion 46, a base end portion 45 is provided. Base end portion 45 has a circular cross section perpendicular to the axis O and projects rearward into the shape of steps to facilitate attachment of a combustion pressure sensor 200 to the main metal fitting 40.

The center shaft 30 is a metal bar made of an iron-based material (for example, Fe—Cr—Mo steel) extending in the direction of the axis O. The center shaft 30 extends through the axial hole 43 of the main metal fitting 40. The top end portion 32 of the center shaft 30 (best seen in FIG. 1) is mechanically linked to the rear end portion 23 of the ceramic heater 20 via a connection ring 28. The electrode 26 disposed at the rear end portion of the ceramic heater 20 is in contact with the inner wall of the cylindrical hole defined by the connection ring 28, and is electrically connected to the center shaft 30. As heretofore described, the main metal fitting 40 and the center shaft 30 are electrically insulated from each other by providing a gap therebetween, and individually act as electrodes electrically connected to the electrodes 25, 26, for purposes of applying a voltage to the heat generating element 24 of the ceramic heater 20. Further, the rear end of the center shaft 30 is formed with a male screw portion 34. A connection terminal 50 for establishing an electrical connection with an external circuit for energizing the ceramic heater 20 is screwed into the male screw portion 34.

Figure 2:
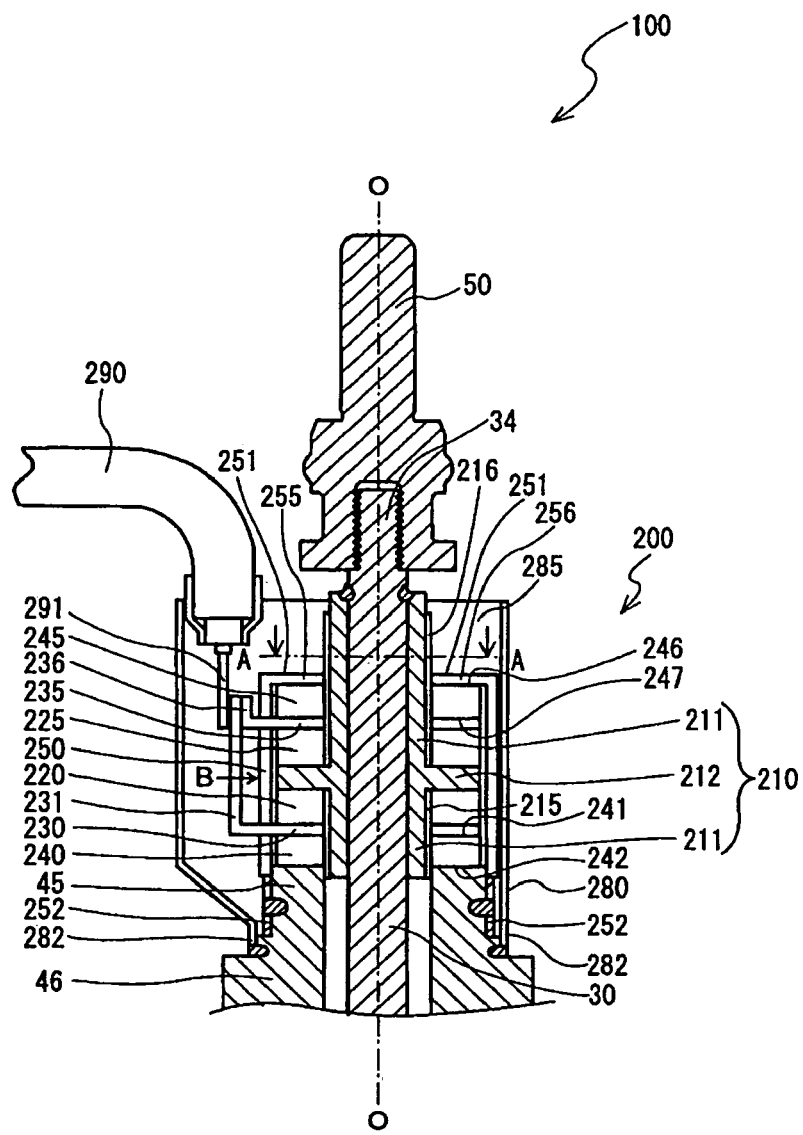
FIG. 2 is a cross-sectional view of the glow plug 100 showing, in an expanded state, the area in the vicinity of the combustion pressure sensor 200.
Figure 3:
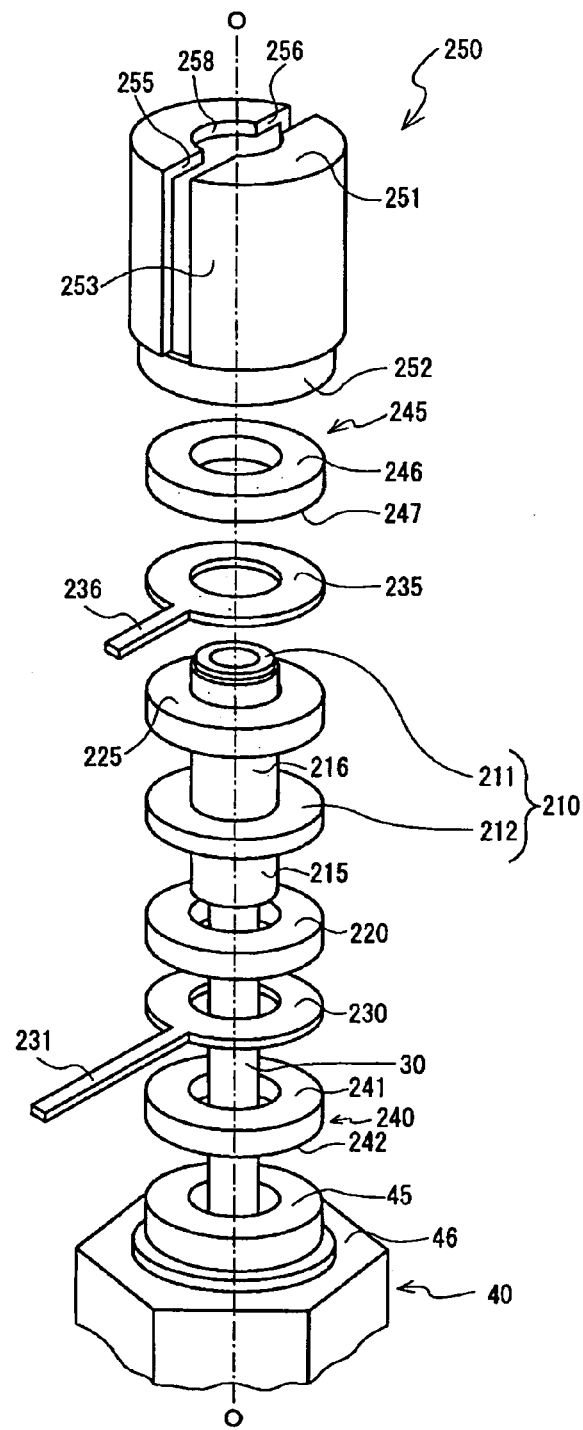
FIG. 3 is an exploded perspective view of the combustion pressure sensor 200.
Figure 4:
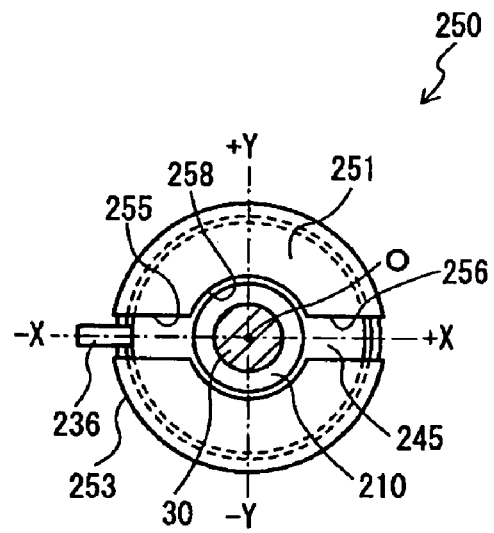
FIG. 4 is a plan view of the area in the vicinity of an upper surface of the case 250 along the double-dashed line A—A of FIG. 2 as seen from the direction along the arrow.
Figure 5:
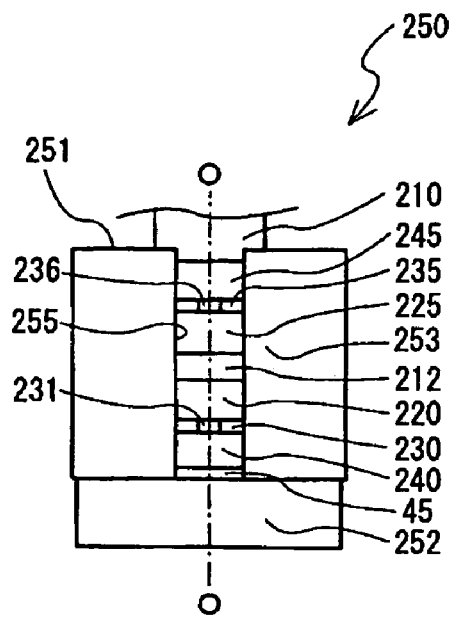
FIG. 5 is a side view of the area in the vicinity of the case 250 as seen from the direction along the arrow B of FIG. 2.

Referring now to FIGS. 2 to 5, the combustion pressure sensor 200 will be described. FIG. 2 is an enlarged, cross-sectional view of the glow plug 100 showing the area in the vicinity of the combustion pressure sensor 200. FIG. 3 is an exploded, perspective view of the combustion pressure sensor 200. FIG. 4 is a plan view of the area in the vicinity of an upper surface 251 of the case 250, taken along the double-dashed line A—A of FIG. 2. FIG. 5 is a side view of the area in the vicinity of the case 250 as seen from the direction along the arrow B of FIG. 2.

As is shown in FIGS. 2 and 3, the combustion pressure sensor 200 includes a sleeve 210. The sleeve 210 has a main body portion 211 and an outwardly extending flange portion 212 that is disposed at a position closer to the top end side than the center of the cylindrical main body portion 211. The sleeve 210 is mounted on the rear end portion of the center shaft 30 extending in the direction of the axis O, and is welded to the center shaft 30 at the rear end of the main body portion 211. An insulating tube 215 is fitted to the sleeve 210 on the top end side of flange portion 212. An insulating member 220, an electrode plate 230, and the piezoelectric element 240 are disposed, in that order starting from the flange portion 212 toward the top end side, in such a manner as to surround the main body portion 211. Similarly, an insulating tube 216 is fitted to the main body portion 211 on the rear end side of flange portion 212 of the main body portion 211. An insulating member 225, an electrode plate 235, and a piezoelectric element 245 are disposed in that order starting from the flange portion 212 toward the rear end side. The insulating members 220, 225, the electrode plates 230, 235, and the piezoelectric elements 240, 245 are formed into the shape of a ring, and are insulated respectively by the insulating tubes 215, 216 from the main body portion 211 of the sleeve 210. The sleeve 210 alone, or the joined body of the sleeve 210 and the center shaft 30 corresponds to the "pressure transmitting member" of the present invention. The flange portion 212 of the sleeve 210 corresponds to the "pressing portion" of the present invention.

The piezoelectric elements 240, 245 are ring-shaped elements containing lead zirconate titanate as a main component. The main body portion 211 of the sleeve 210 is disposed within the opening defined by the ring-shaped, piezoelectric elements 240, 245. Each of the piezoelectric elements 240, 245 is polarized in the direction of its thickness, that is, in the direction the axis O when it is assembled onto the combustion pressure sensor 200. The piezoelectric element 240 is arranged such that, when subjected to a stress caused by compressing piezoelectric element 240 in the direction of the axis O, it generates a negative charge on the surface 242 at the side of the base end portion 45 of the main metal fitting 40, and it generates a positive charge on the surface 241 at the side of the electrode plate 230. Similarly, the piezoelectric element 245 is arranged such that, when subjected to a stress caused by compressing piezoelectric element 245 in the direction of the axis O, it generates a positive charge on the surface 246 at a side of the upper surface 251 of the case 250, and it generates a negative charge on the surface 247 at the side of the electrode plate 235.

The electrode plates 230, 235 are respectively ring-shaped electrodes to which the charges generated on the surfaces 241, 246 of the piezoelectric elements 240, 245 are introduced. Terminal portions 231, 236 connect to a core wire 291 of a signal wire 290 for establishing an electric connection with an external circuit. Terminal portions 231, 236 project from the edge portions of the respective electrode plates 230, 235 in such a manner that the terminal portions 231, 236 extend out in a direction perpendicular to the axis O. When the combustion pressure sensor 200 is assembled, the core wire 291 is joined to the folded terminal portions 231, 236. As a result, the respective surfaces 241, 247 of the piezoelectric elements 240, 245 are electrically connected to the external circuit via the signal wire 290. The electrode plates 230, 235 correspond to "electrodes" of the present invention.

The insulating members 220, 225 are ring-shaped spacers made of alumina ceramics. Each of them is arranged so as to insulate the electrode plates 230, 235 from the flange portion 212 of the sleeve 210.

The case 250 is made of a cylindrical metallic member. As best seen in FIGS. 3 and 5, the outer diameter of a base portion 252 at one end side thereof is reduced. The base portion 252 is laser-welded to the side surface of the base end portion 45 of the main metal fitting 40, so that the main metal fitting 40 and the case 250 are integrated into a one piece unit. At the other end side of the case 250, an upper surface 251 is formed. The upper surface 251 intersects with the direction of the axis O in order to pre-load the piezoelectric elements 240, 245 that are accommodated within the case 250. Slits 255, 256 and an opening 258 through which the center shaft 30 is passed, are formed in case 250 and the slits 255, 256 extend from upper surface 252. to peripheral surface 253. Slits 255, 256 are dimensioned to allow the terminal portions 231, 236 of the electrode plates 230, 235 to extend out of the case 250. The case 250 corresponds to the "supporting portion" of the present invention.

As shown in FIG. 4, a circular opening 258 is formed in the upper surface 251 of the case 250 through which the center shaft 30 and the body portion 211 of the sleeve 210 extends along axis O. The slit 255 has a predetermined width, and is formed to extend from the position of the axis O in one direction intersecting the axis O (–X direction in FIG. 4). As shown in FIG. 5, this slit 255 is formed so as to be continuous along the outer peripheral surface 253 of the case 250, and thus, is formed in the direction of the axis O on the outer peripheral surface 253. The slit 255 corresponds to the "first opening" of the present invention.

As shown in FIG. 4, the slit 256 has essentially the same shape as the slit 255, and is formed to extend from the position of the axis O in the direction 180° opposite to slit 255 (that is, a +X direction in FIG. 4) when seen from above. Slit 256 is opened in a state of being continuous with the outer peripheral surface 253 of case 250. Specifically, as shown in FIG. 4, the slit 255 and the slit 256 are symmetrical with respect to a line along a Y axis in FIG. 4, and are symmetrical with respect to a line along a X axis, when viewed along the axis O (when the case 250 is projected onto a cross section along the line A—A in FIG. 2). In other words, the slit 255 and the slit 256 are located at positions where they are symmetrical to each other with respect to a line along the position of the axis O when they are projected onto a plane intersecting the axis O. The slit 256 corresponds to the "second opening" of the present invention.

One of the slits 255, 256 formed on the case 250 as described above (in this embodiment, the slit 255) is formed as an opening through which the terminal portions 231, 236 of the electrode plates 230, 235 are to extend out of the case 250. The other of slit 255 or 256 is formed as a dummy opening for allowing the pre-load from the case 250 to be applied equally to the piezoelectric elements 240, 245.

As shown in FIG. 2, the outside of the case 250 accommodating the piezoelectric elements 240, 245, and the like is covered with and protected by a cylindrical cover body 280. One end portion 282 of the cover body 280 is welded to the base end portion 45 of the main metal fitting 40, whereas the other end side of cover body 280 is opened. Further, the cover body 280 is formed in a manner such that the outer diameter of cover body 280, at the location where the signal wire 290 is to be disposed, is enlarged so as to facilitate attachment of the top end of the signal wire 290 to the terminal portions 231, 236. Then, resin 285 is charged inside the cover body 280. The resin 285 protects the main body of the combustion pressure sensor 200 by preventing water or oil from entering into the cover body 280, and also fixes the signal wire 290. The signal wire 290 can be fixed more firmly by crimping the outer periphery of the signal wire 290 with a metallic ring-shaped member and by then welding the ring-shaped member to the cover body 280.

Figure 6:
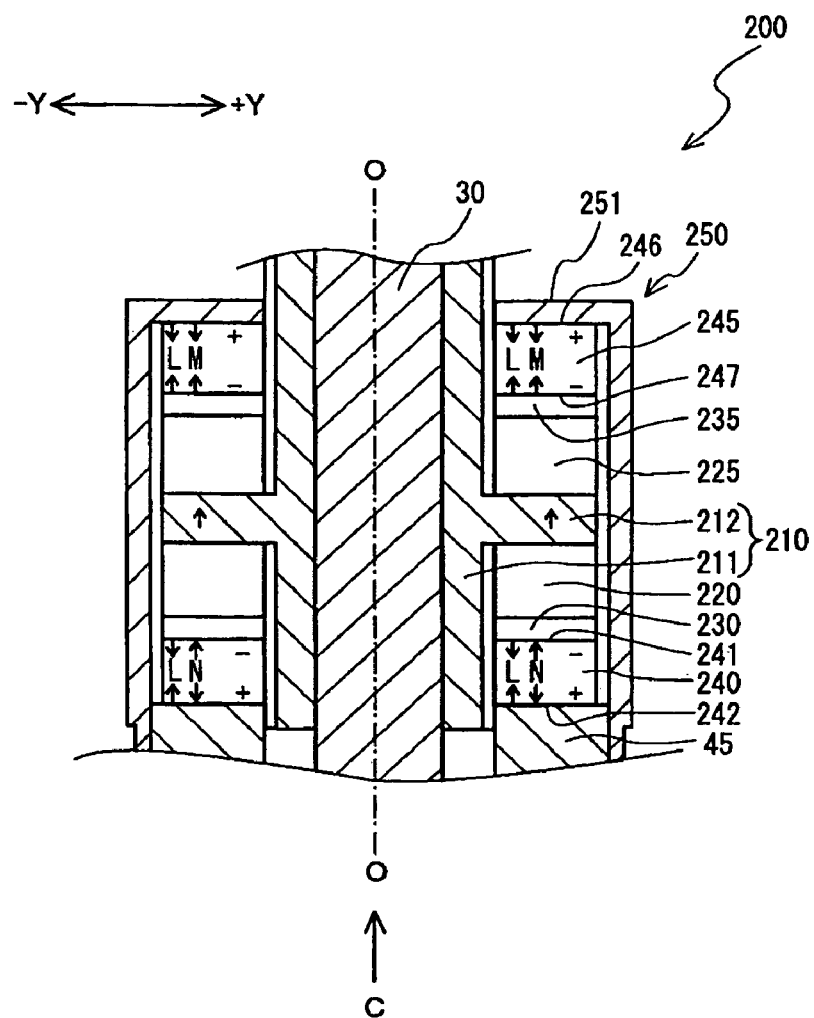
FIG. 6 is a schematic diagram showing a state of the charges generated in the piezoelectric elements 240, 245 when the force influenced by the combustion pressure is transmitted.

Hereinafter, an operation of sensing a combustion pressure in the glow plug 100 including thus-structured combustion sensor 200 will be described with reference to FIG. 6. FIG. 6 is a schematic diagram showing a state of charges generated in the piezoelectric elements 240, 245 in a case where the force exerted by the combustion pressure is transmitted. In FIG. 6, a description will be made using a schematic diagram of the cross section of the combustion pressure sensor 200 passing through the axis O and the Y axis shown in FIG. 4.

When the engine is not in an actuated state, no rocking due to the vibration of the engine or the like is generated, and no force is exerted onto the center shaft 30 by the combustion pressure from the combustion chamber. Thus, no displacement is produced in the center shaft 30; and the piezoelectric elements 240, 245 are in pre-loaded state L, indicated by arrows L in FIG. 6 and do not deform, and therefore, do not generate charges.

When the engine is started in this state and the pressure within the combustion chamber increases, as shown in FIG. 6, the center shaft 30 deforms in the direction shown by an arrow C in the drawing. As a result, the piezoelectric element 245 is subjected to a compression load M, indicated by arrows M in FIG. 6, between the flange portion 212 and the upper surface 251. Then, the piezoelectric element 245 is subjected to a further increased load based on the initial state L where the piezoelectric element 245 is pre-loaded. As a result, a positive charge is generated on the side of the surface 246, whereas a negative charge is generated on the side of the surface 247.

On the other hand, in the piezoelectric element 240, since the flange portion 212 is moved in a direction along which the pre-load L exerted between the flange portion 212 of the sleeve 210 and the base end portion 23 of the main metal fitting 40 decreases, the piezoelectric element 240 is subjected to a stretching load N, indicated by arrows N in FIG. 6. Thus, the piezoelectric element 240 is subjected to a decreased load based on the initial state L in which the piezoelectric element 240 is pre-loaded. As a result, a negative charge is generated on the side of the surface 241, whereas a positive charge is generated on the side of the surface 242.

Then, the negative charge of the surface 241 and the negative charge of the surface 247 are introduced to the electrode plates 230, 235. Similarly, the positive charge of the surface 242 and the positive charge of the surface 246 are introduced to the base end portion 45 and the upper surface 251. Then, the positive and negative charges are summed up. In this manner, an output (charge) can be obtained that is substantially twice as great as in the case where only one piezoelectric element is used.

When the force influenced by the combustion pressure as described above is transmitted via the center shaft 30, the piezoelectric elements 240, 245 are compressed or stretched. By obtaining the charge generated at this time as an output, the combustion pressure is sensed. On the other hand, if the glow plug 100 receives the rocking generated caused by factors such as the vibration of the engine, the center shaft 30 gains an inertial force. As a result, in addition to the force containing the component in the direction of the axis O, a force containing a component in the direction intersecting the axis O is transmitted to the main metal fitting 40 fixed to the engine head.

As described above, when the case 250 is viewed in a state where the image of the case 250 is projected onto the plane intersecting the axis O, the slit 255 and the slit 256 are symmetrical in terms of a line centered on the position of the axis O. Thus, when the combustion sensor 200 is viewed in its cross section containing the axis O, the shape of the case 250 is also horizontally symmetrical centered on the axis O.

Figure 7:
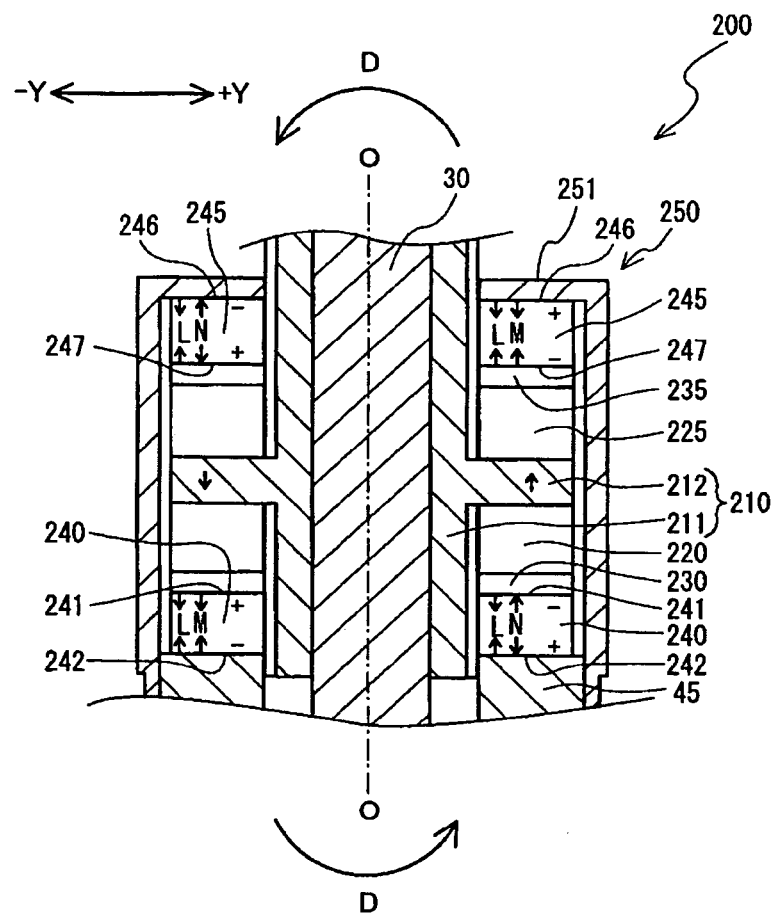
FIG. 7 is a schematic diagram showing a state of the charges generated in the piezoelectric elements 240, 245 in the portion where no slits 255, 256 are formed.
Figure 8:
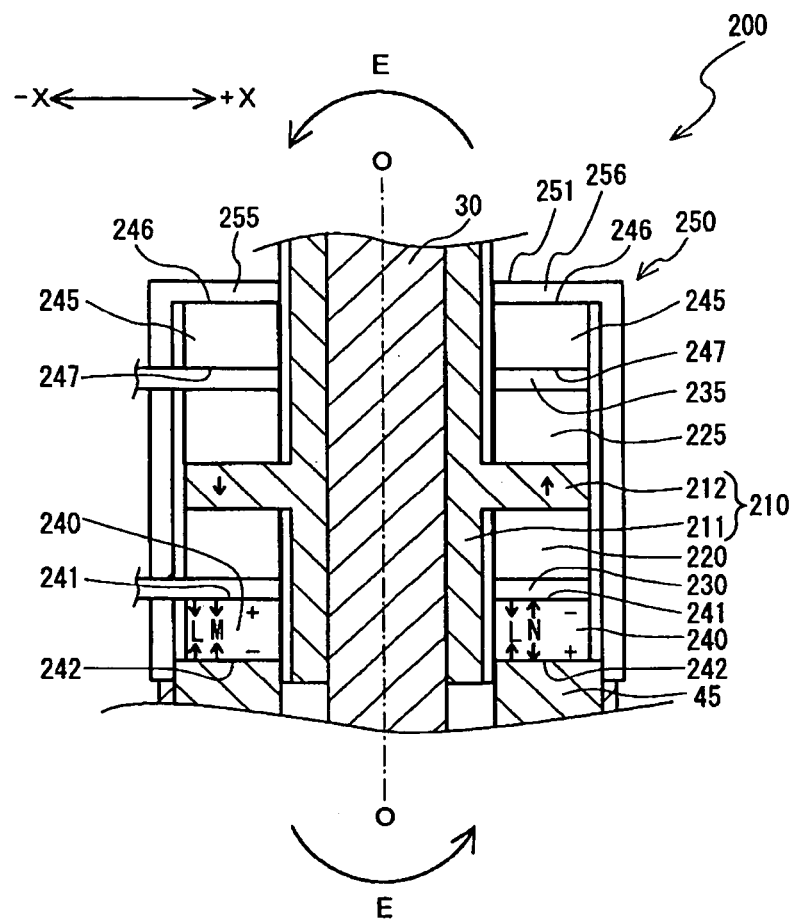
FIG. 8 is a schematic diagram showing a state of the charges generated in the piezoelectric elements 240, 245 in the portion where the slits 255, 256 are formed.

Hereinafter, an operation of the combustion pressure sensor 200 when the glow plug 100 is subjected to rocking generated by the vibration of the engine will be described using FIGS. 7 and 8. FIG. 7 is a schematic diagram showing a state of charges generated in the piezoelectric elements 240, 245 at the portions where slits 255, 256 are not formed. FIG. 8 is a schematic diagram showing a state of charges generated in the piezoelectric elements 240, 245 at the portions where slits 255, 256 are formed. A description will be made using, in FIG. 7, a schematic diagram of a cross section of the combustion pressure sensor 200 passing through the axis O and the Y axis shown in FIG. 4, and using, in FIG. 8, a schematic diagram of a cross section of the combustion sensor 200 passing through the axis O and the X axis.

As shown in FIG. 7, on the cross section including the axis O formed with no slits 255, 256, if the center shaft 30 receives a force in a rocking direction caused by the influence of the vibration of the engine or the resonation of the center shaft 30 itself, the center shaft 30 exhibits reciprocating movement in a direction perpendicular to the axis O (in FIG. 7, Y and −Y directions) even at the site where the combustion pressure sensor 200 is located. Hereinafter, a description will be made of a case where, in this reciprocating movement, the center shaft 30 rocks in the direction wherein the center shaft 30 is inclined with respect to the axis of the main metal fitting 40, for example, in the direction D.

When combustion pressure sensor 200 is subjected to the force along the direction D shown in FIG. 7, the flange 212 of the sleeve 210 displaces toward the top end side of the glow plug 100 (downward in FIG. 7) at the side toward the −Y direction from the axis O, whereas the flange 212 of the sleeve 210 displaces toward the rear end side of the glow plug 100 (upward in FIG. 7) at the side toward the +Y direction from the axis O. At the side toward the −Y direction, a compression load M is exerted onto the piezoelectric element 240, so that the a positive charge is generated on the side of the surface 241 and a negative charge is generated on the side of the surface 242. In addition, a stretching load N is exerted onto the piezoelectric element 245 in the direction along which the pre-load L decreases, so that a negative charge is generated at the side of the surface 246 and a positive charge is generated at the side of the surface 247. On the other hand, at the side toward the +Y direction from the axis O, a stretching load N is exerted onto the piezoelectric element 240, so that a negative charge is generated at the side of the surface 241 and a positive charge at the side of the surface 242. In addition, a compression load M is exerted onto the piezoelectric element 245, so that a positive charge is generated at the side of the surface 246 and a negative charge is generated at the side of the surface 247.

As a consequence, on the surface 241 of the piezoelectric element 240 that is in contact with the electrode plate 230, the positive charge generated at the side of the −Y direction from the axis O is compensated by the negative charge generated at the side of the +Y direction from the axis O as a result of energization to the electrode plate 230. Similarly, on the surface 247 of the piezoelectric element 245 that is in contact with the electrode plate 235, the positive charge generated at the side of the −Y direction from the axis O is compensated by the negative charge generated at the side of the +Y direction from the axis O as a result of energization to the electrode plate 235. In this manner, at the portions where slits 255, 256 are not formed, the pre-load L is exerted equally onto the portions of the piezoelectric elements 240, 245 located at opposite sides centered on the axis O. Due to this, even if the center shaft 30 is inclined with respect to the axis O, the charges generated in respective portions compensate for each other. In this state, even if the compression load M or the stretching load N generated by the combustion pressure are further exerted onto the piezoelectric elements 240, 245, and charges are additionally increased, the deducted amount of charges between the positive charge and the negative charge is based on the combustion pressure. As a result, no "noise" occurs. In other words, fluctuations caused by the "rocking" of combustion sensor 200 do not interfere with measurement of the compression pressure force.

Incidentally, the following phenomenon occurs at some portions of the slits 255, 256. Since the slits 255, 256 are present on the upper surface 251 of the case 250, the piezoelectric element 245 has a portion onto which a load is not directly exerted. However, since the piezoelectric element 245 is made of a piezoelectric ceramic such as lead zirconate titanate as described above, the piezoelectric element 245 possesses a certain level of toughness. Therefore, when the piezoelectric element 245 deforms by the load (for example, by the compression load M) exerted from the upper surface 251 (deforms by compression), the portion of the piezoelectric element 245 opposite the slit (either one of the slits 255 and 256) also slightly deforms in the same direction. The magnitude of the deformation is smaller than the deformation of the portion of the upper surface 251 which has been deformed by a direct load. However, charges corresponding to the direction of deformation are generated on the surfaces 246, 247, respectively.

Therefore, on the cross section containing the axis O including the portions formed with the slits 255, 256 shown in FIG. 8, as is the case of the cross section including no slits 255, 256 shown in FIG. 7, the end result is that the charge generated by the piezoelectric element 245 at the side of the −X direction from the axis O and the charge generated by the piezoelectric element 245 at the side of the +X direction compensate for each other. The same case applies in circumstances where a further load is exerted.

As described above, since the slits 255, 256 formed on the case 250 are symmetrical with respect to a line about the axis O, the piezoelectric elements 240, 245 are symmetrical about the axis O whenever they are centered on every cross section containing the axis O. Therefore, even if the force transmitted via the center shaft 30 has a component in a direction intersecting the axis O in addition to the component in a direction of the axis O, the charges generated compensate for each other and never cause noise.

EXAMPLE 1

In order to confirm the effect described above, a glow plug 100 was assembled on to an internal combustion engine (not shown), and an output from a combustion pressure sensor 200 was checked. First of all, a glow plug (sample 1) including a case 250 formed with a slit 255, but not a slit 256 which has conventionally been employed, and a glow plug 100 (sample 2) of this embodiment, as heretofore described, were prepared. Then, the combustion pressure of the internal combustion engine that was used for testing was measured by use respectively of sample 1 and sample 2. At this time, the measurement was conducted in a state where the magnitude of the combustion pressure was adjusted by use of a reference pressure sensor (model 6052A, manufactured by KISTLER) so as to be identical in a case where an evaluation test for the sample 1 was conducted and a case where an evaluation test for the sample 2 was conducted.

Figure 9:
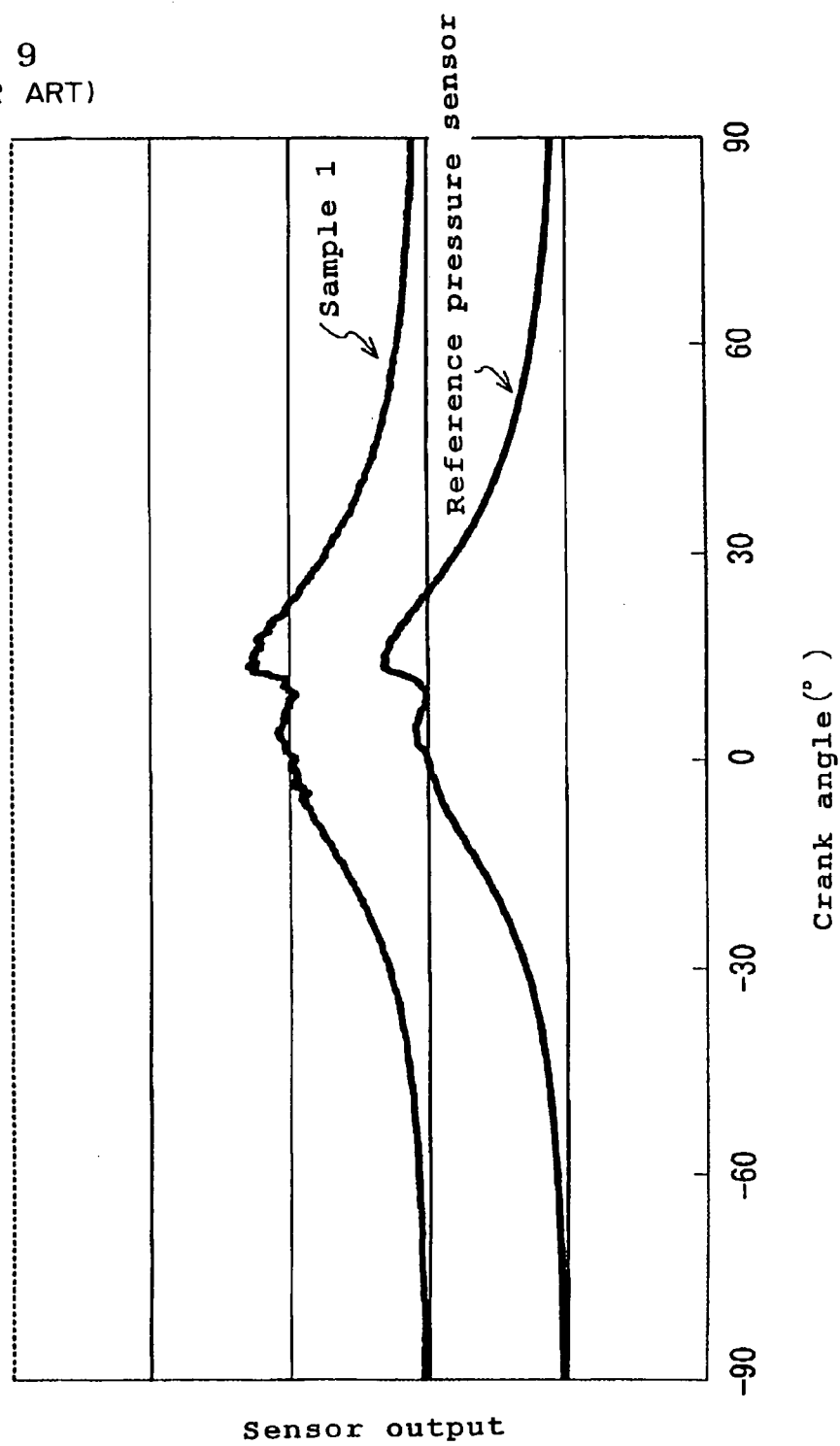
FIG. 9 is a graph showing the output of a conventional combustion pressure sensor with respect to the crank angle of the internal combustion engine.
Figure 10:
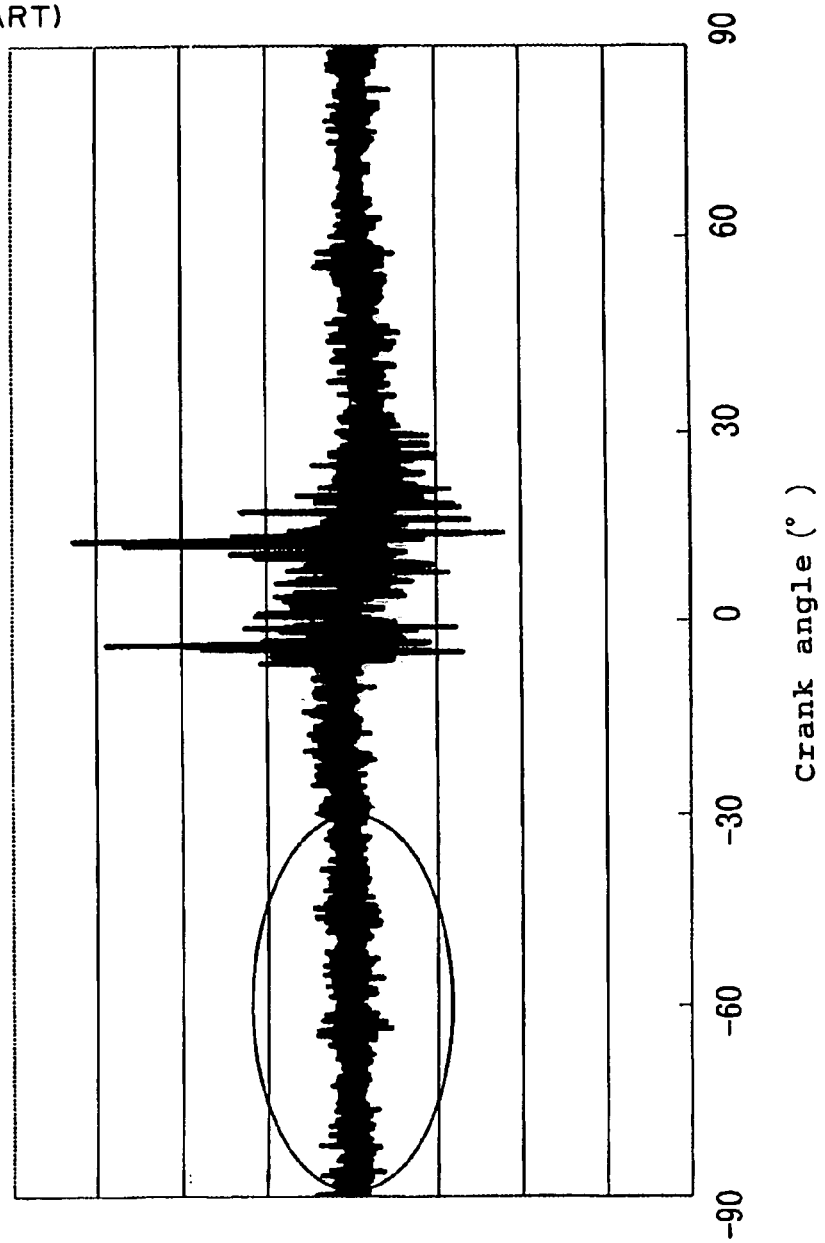
FIG. 10 is a graph showing the output waveform of a conventional combustion pressure sensor shown in FIG. 9 converted into minutely divided waveform.
Figure 11:
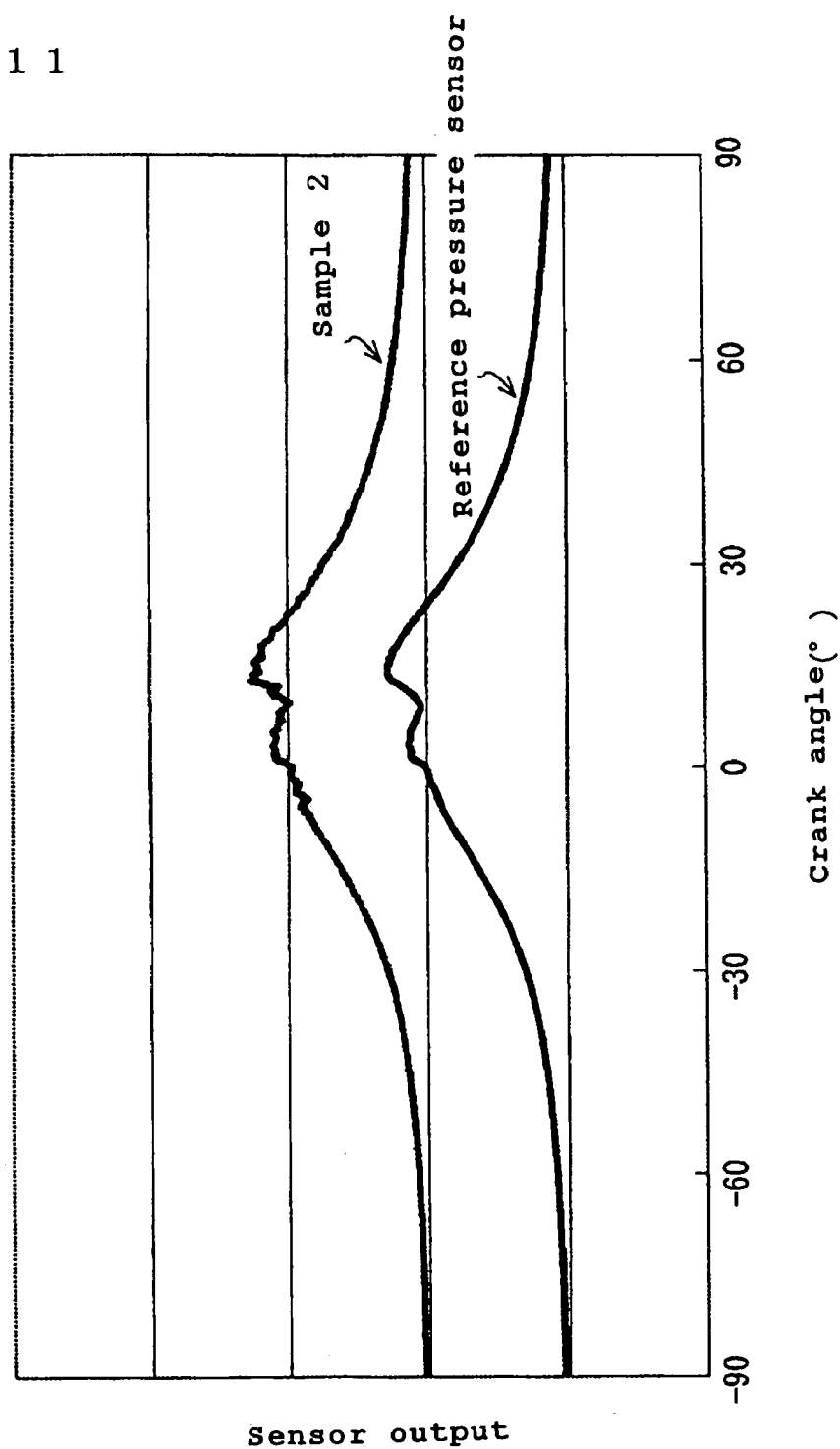
FIG. 11 is a graph showing the output of the combustion pressure sensor of the present embodiment with respect to the crank angle of the internal combustion engine.

More specifically, an output (an output that makes the signal wire 290 and the main metal fitting 40 to be bipolar) of the sample 1 or the sample 2 was connected to a charge amplifier (model 5011, manufactured by KISTLER), and an output of a reference pressure sensor was connected to a charge amplifier of the same model additionally prepared. Further, the output of each charge amplifier was connected to an X axis input of an oscilloscope. Further, in order to observe the relationship between the internal combustion engine and the crank angle, an output of a crank angle sensor was also connected to a Y axis input of the oscilloscope. In this state, the internal combustion engine was started, and as a result, a waveform shown in the graph of FIG. 9 was obtained for the sample 1, and a waveform shown in the graph of FIG. 11 was obtained for the sample 2. At this time, the output of the reference pressure sensor was adjusted in such a manner that in both graphs it exhibited the same peak value. Further, the waveforms of the sample 1 and the sample 2 were respectively converted into minutely divided waveforms from the graphs of FIGS. 9 and 11 obtained, so that raw waveforms of the combustion sensor were obtained with respect to the crank angles shown in FIGS. 10 and 12 respectively.

Figure 12:
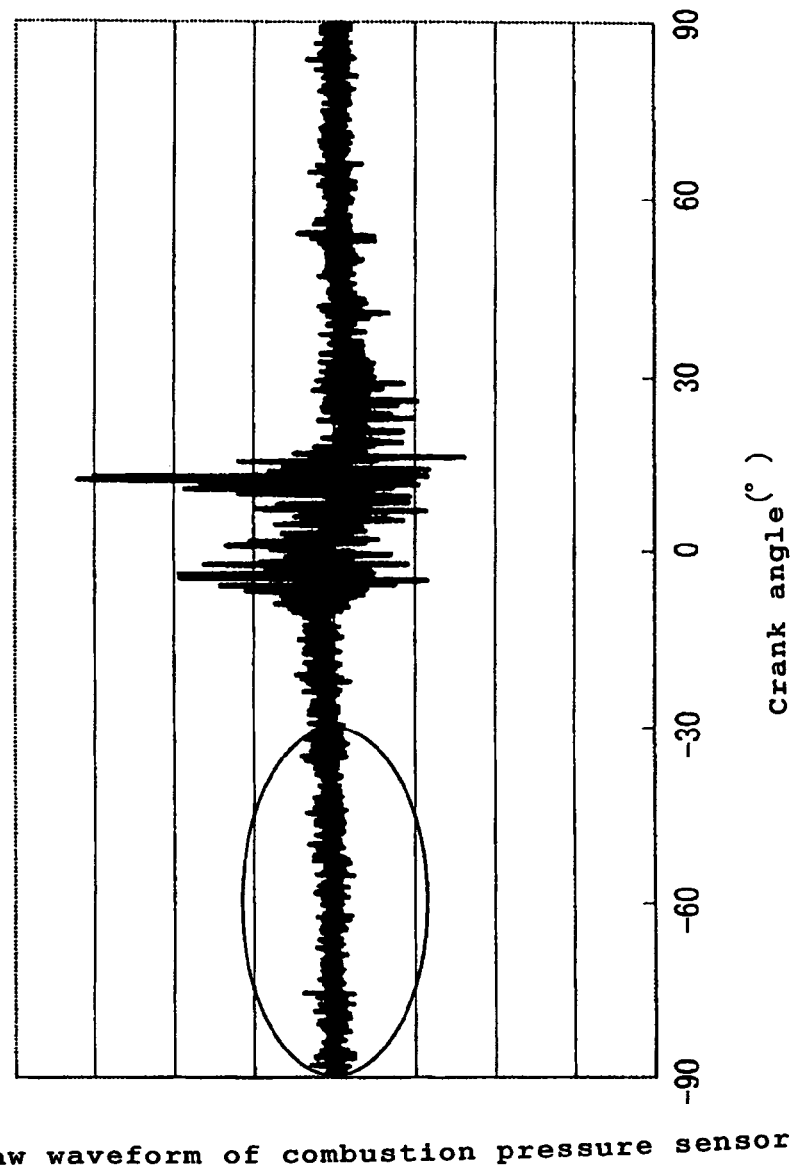
FIG. 12 is a graph showing the output waveform of the combustion pressure sensor shown in FIG. 11 converted into minutely divided waveform.

As a result of this evaluation test, as a comparison between the raw waveforms of the combustion pressure sensors of sample 1 (a conventional glow plug) and of sample 2 (a glow plug of this embodiment), there was no significant difference between the amplitudes of the raw waveforms of the combustion pressure sensors in the vicinity of crank angle 0° at which a large combustion pressure was sensed. However, it is understood that, at the portions where large combustion pressures were not sensed in the vicinity of the crank angles between −90° to −30° (the portions enclosed by an ellipse in the drawings), the amplitude of the raw waveform of the combustion pressure sensor in the case of sample 1 (FIG. 10) was clearly greater than the amplitude in the case of sample 2 (FIG. 12). That is, it was revealed that sample 1 was subjected to rocking generated by the vibration of the engine and the like, and the piezoelectric element detected and outputted a noise occurring as a result of the influence of the force containing a component in the direction intersecting the axis O, and as a result, noise was displayed at a level commensurate with the magnitude of the amplitude of the raw waveform of the combustion pressure sensor.

On the other hand, in the sample 2, which is the glow plug of this embodiment, the amplitude of the raw waveform of the combustion pressure sensor based on the noise occurring as a result of the vibration of the engine and the like was less than that in the case of sample 1. Due to this arrangement, by virtue of forming a slit symmetrical about the axis O as a center in addition to the slit for enabling the electrodes to extend out of the case, the relationship between the piezoelectric element and all of the cases to which a pre-load is applied, the sleeve, and the base end portion of the case can be symmetrical, centered on the axis O, on every cross section intersecting the axis O of the combustion pressure sensor. Then, even if the piezoelectric element is subjected to the influence of the force having the component in the direction intersecting the axis O based on the vibration of the engine, and noises occur, the noises can be compensated for and the S/N ratio with respect to the peak value of the sensor output signal can be increased.

Figure 13:
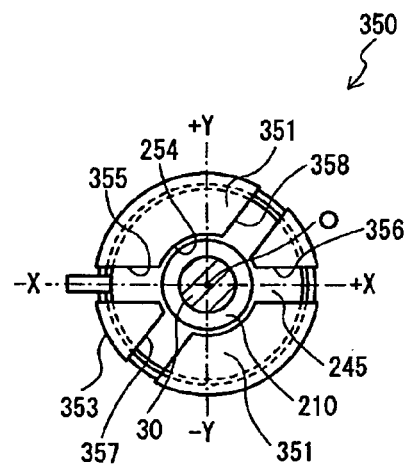
FIG. 13 is a plan view of a case 350 showing an exemplary modification of the position where the slit is formed.

Various modifications can be made to the present invention. For example, as in a case 350 shown in FIG. 13, a plurality of slits can be formed in addition to the slits 355, 356 similar to this embodiment. In this case, for example, a dummy slit 357 may be formed in an arbitrary direction from the position of the axis O. In addition, a dummy slit 358 is also formed in the same shape as the dummy slit 357 so as to be a pair with the slit 357 and facing in the direction at 180° opposite to the position centered on the axis O. In this manner, on the cross section of the combustion sensor containing the axis O, the pre-loads exerted on the site at one side, and the site at the other side about the axis O of the piezoelectric element 245, can be equal on every cross section described above. As a result, the influence of noises caused by vibration of the engine can be mitigated. The numbers, widths, and the shapes of the slits are not specifically limited as long as slits are formed symmetrically in relation to the position centered on the axis O. Of course, the shape is not limited to a slit, and alternatively, the shape may be in the form of a hole such as a circular hole, an elliptical hole, a rectangular hole, or the like, or may be formed into a cutaway hole having opened end portions.

In addition, the slit 255 and the slit 256 need not necessarily be arranged along the straight line passing through the position of the axis O. It is sufficient if the dummy slit is formed in an area intersecting the straight line directed from the position of the axis O toward the slit 255, partitioned therefrom by the straight line passing through the position of the axis O, and opposed to the area at which the slit 255 is formed. In this manner, the formation of slits concentrated on at least only one of the areas can be prevented. Even if it is impossible to prevent unbalanced distribution of the charges completely, in contrast to a case where these slits are formed at positions opposed at 180° to the position centered on the axis O, as is the case of this embodiment, the charges can to some degree be compensated for. Thus, the generation of noises can be reduced.

In addition, a ceramic heater 20 is provided in this embodiment as a heater member incorporated into the glow plug 100. The heater member may alternatively be a sheath heater including a sheath tube of which a top end portion is closed into the shape of a ball and a heat generating resistor and a control coil are disposed in the sheath tube. In addition, as shown in FIG. 5, the slit 255 (256) is formed on the outer peripheral surface 253 of the case 250 so as to extend from the side of the upper surface 251 to reach the base portion 252. Alternatively, no slit 255 (256) may be formed on the upper surface 251 of the case 250 and a slit 255 (256) may be formed only on the side surface of the case 250.

Of course, a slit as a dummy (a second opening in the present invention) is not restricted to having a terminal portion and a signal wire for obtaining outputs. Normally, the larger the pre-load applied to the piezoelectric element is, the larger the sensor output becomes. Therefore, rare cases exist where the number of slits is increased as far as possible. Instead, it is conceivable that one or a plurality of all the existing terminal portions and signal wires are drawn out through one slit. However, when plural signal wires are present, even if the signal wires are drawn out through an arbitrary slit, the case remains in a symmetrical shape with respect to the axis. From a point of view of making the toughness of the case uniform, it is rather preferable to draw out signal wires through one slit so that each of the slit sizes can be reduced.

Figure 14:
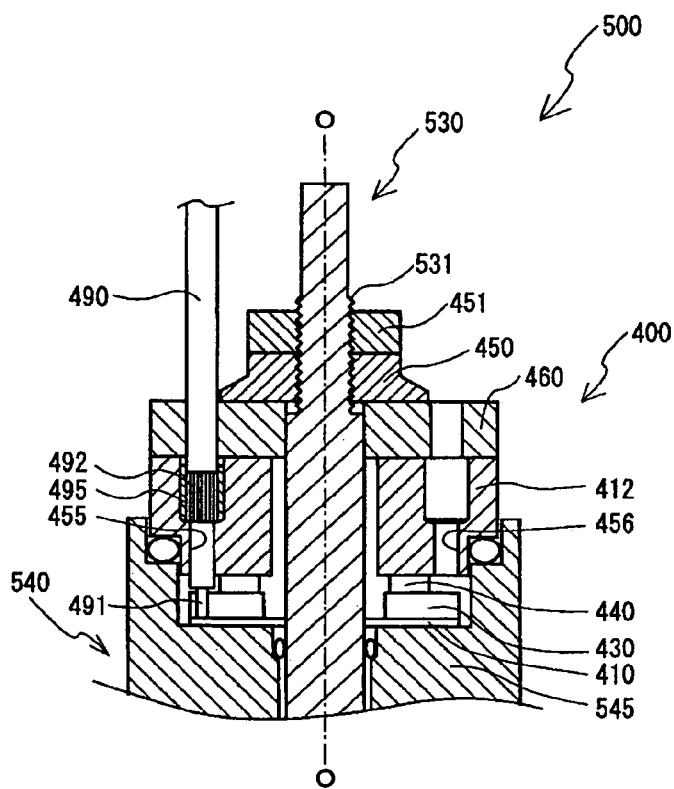
FIG. 14 is a cross-sectional view of the glow plug 500 as an exemplary modification showing, in an expanded state, the area in the vicinity of the combustion pressure sensor 400.

Further, in this embodiment, the case 250 is shown as an example of a supporting portion. Alternatively, a base end portion at the rear end portion at the rear end side of the main metal fitting, or the base end portion provided with another member, may be employed as a supporting portion. Then, the piezoelectric element may be held between the thus-structured supporting member and the pressing portion provided at the rear end side of the center shaft to apply a pre-load to the piezoelectric element. As an example, a glow plug 500 shown in FIG. 14 will be described. FIG. 14 is a cross-sectional view in which the area in the vicinity of a combustion sensor 400 of a glow plug 500 has been enlarged as a modified example.

As shown in FIG. 14, the combustion pressure sensor 400 of the glow plug 500 has a form in which a piezoelectric element 440 is held between a base end portion 545 of a main metal fitting 540 and a pressure member 412 which is displaced in the direction of an axis O as a center shaft 530 displaces in the direction of the axis O. The base end portion 545 of the main metal fitting 540 has a circular cross section along the axis provided at the rear end of the main metal fitting 540, as is the case of this embodiment, and the edge portion protrudes rearward into the shape of steps. The center shaft 530 passes through the center of the base end portion 545 along the axis O, and is exposed behind the base end portion 545. Then, within the base end portion 545, an insulating sheet 410, an electrode 430, a piezoelectric element 440 all of which are in the shape of a circular ring, are disposed in a laminated state, and the piezoelectric member 440 is pressed toward the base end portion 545 by the pressing member 412 located behind the laminated structure. The base end portion 545 and the pressing member 412 respectively correspond to the "supporting portion" and the "pressing portion" described in the sixth embodiment of this invention.

The pressing member 412 assumes a circular cylindrical shape, and its forward side has a smaller diameter than those of the remaining portions thereof. The pressing member 412 is formed with a through hole 455 along the direction of the axis O through which a signal wire 490 is passed for extracting the output of the piezoelectric element 440. The signal wire 490 is a coaxial cable, and its inner core wire 491 is connected to an electrode 430 that is in contact with the forward surface of the piezoelectric element 440. Further, an outer shield wire 492 is electrically connected within the through hole 455 with a conductive pressing member 412 which is in contact with a rearward surface of the piezoelectric element 440 via a crimping member 495. At the opposite side of the through hole 455 of the pressing member 412, a through hole 456 having the same shape as the through hole 455 is formed with the axis O interposed between the through holes 455 and 456. At the side rearward of the pressing member 412, a circular ring-shaped insulating member 460 is disposed. Further, the pressing member 412 is pressed by nuts 450, 451 screwed with the screw portion 531 formed at the rear end side of the center shaft 530 via the insulating member 460 in a state where the pressing member 412 applies a pre-load to the piezoelectric element 440 sandwiched between the pressing member 412 and the base end portion 545. The through hole 455 and the through hole 456 respectively correspond to the "first opening" and the "second opening" described in the sixth embodiment of the present invention.

In the glow plug 500 thus structured, the center shaft 530 and the nuts 450, 451 displace rearward in the direction of the axis O by means of combustion pressure, and the force pressing the insulating member 460 and the pressing member 412 frontward decreases. As a result, the pre-load applied to the piezoelectric element 440 decreases accordingly. Based on the decrease in the pre-load, the combustion pressure is sensed. Since the through hole 455 is formed in the pressing member 412 as described above, the rigidity of the pressing member 412 becomes non-uniform. For this reason, the pre-load applied from the pressing member 412 to the piezoelectric element 440 may be non-uniform. As is the case of this embodiment, since the through hole 456 is formed in the pressing member 412 as a dummy opening, a balanced pre-load can be applied from the pressing member 412 to the piezoelectric element 440. Thus, when sensing of the combustion pressure is conducted, noises based on the rocking caused by factors such as the vibration of the engine can be reduced. In this modification, since the signal wire 490 is taken out from the rear end side of the combustion pressure sensor 400 via the insulating member 460, through holes are provided in the insulating member 460 as well. Alternatively, the signal wire 490 may be taken out from the side surface of the pressing member 412. The first opening and the second opening of the present invention are not necessarily required for the insulating member 460.

Further, in this embodiment, the flange 212 of the sleeve 210 as the pressing member is displaced in the direction of the axis O, and a pre-load is applied to the piezoelectric elements 240, 245 in said direction. Alternatively, for example, the pressing surface of the pressing member may face a direction different from the plane intersecting the axis O, and in these circumstances a pre-load is applied to the piezoelectric element in a direction different from the axis O.

Further, in this embodiment, two piezoelectric elements are used. However, the number of piezoelectric elements need not be limited to two, but the present invention is applicable regardless of the number of piezoelectric elements used.

The present invention can be utilized for a combustion pressure sensor for sensing the combustion pressure of an internal combustion engine, a glow plug including a combustion pressure sensor, a temperature sensor, and the like.

The invention claimed is:

1. A combustion pressure sensor (200/400) for sensing a combustion pressure of an internal combustion engine, comprising:
   piezoelectric elements (240, 245/440) for sensing a change in stress exerted on themselves;
   a supporting portion (250/350/545) for supporting said piezoelectric elements (240, 245/440);
   pressure transmitting members (210, 30/530) having the shape of a bar extending in an axial direction, displaceable relatively in said axial direction with respect to said supporting portion (250/350/545) as combustion pressure varies;
   a pressing portion (212/412) for exerting a pre-load to compress said piezoelectric elements (240, 245/440) between said pressing portion (212/412) and said supporting portion (250/350/545), said pressing portion (212/412) displacing in said axial direction as said pressure transmitting members (210, 30/530) displace; and
   electrodes (230, 235/430) interposed between said supporting member (250/350/545) and said pressing portion (212/412), for outputting a change in the stress sensed by said piezoelectric elements (240, 245/440) as an electric signal, wherein either one of said pressing member (212/412) and said supporting portion (250/350/545) is formed with:
   a first opening (255/355/455) for taking out a signal line (290/490) that establishes an electric connection between an external circuit and said electrodes (230, 235/430); and
   at least one or more second openings (256/356, 357, 358/456) that are different from said first opening (255/355/455).

2. The combustion pressure sensor (20/400) according to claim 1,
   wherein, when an image of a site of either one of said pressing member (212/412) and said supporting portion (250/350/450) that is formed with said first opening (255/355/455) is projected onto a plane intersecting said axis and said projected image is viewed,
   said second opening (256/356, 357, 358/456) is formed in an area which is opposite the area where said first opening (255/355/455) is formed and is partitioned therefrom by a straight line containing said axis and intersecting a direction from said axis toward said first opening (255/355/455).

3. The combustion pressure sensor (200/400) according to claim 1,
   wherein, when an image of a site of either one of said pressing member (212/412) and said supporting portion (250/350/450) that is formed with said first opening (255/355/455) is projected onto a plane intersecting said axis and said projected image is viewed,
     said first opening (255/355/455) and said second opening (256/356, 357, 358/456) are formed in such a manner that the site of either one of said pressing portion (212/412) and said supporting portion (250/350/545) formed with said first opening (255/355/455) is bilaterally symmetrical,
     regardless of when a straight line passing through said axis and containing a direction that extends from said axis toward said first opening (255/355/455) is employed as a center, or
     when a straight line intersecting said straight line and passing through said axis is employed as a center.

4. The combustion pressure sensor (20/400) according to claim 1,
   wherein, when an image of a site of either one of said pressing member (212/412) and said supporting portion (250/350/450) that is formed with said first opening (255/355/455) is projected onto a plane intersecting said axis and said projected image is viewed,
   in a direction opposed to a direction from said axis toward an arbitrary opening which is either one of said first opening (255/355/455) and said second opening (256/356, 357, 358/456), an opening having the same shape as said opening and constituting a pair with said opening is formed.

5. A glow plug (100) comprising:
   a main metal fitting (40) formed with an axial hole (43) extending along an axis;
   a center shaft (30) passed through said axial hole (43) and held by said main metal fitting (40) so as to be movable along said axial direction;
   a heater member (20) that includes a heat generating body (24) at its top end side and of which a rear end side is fixed to the top end of said center shaft (30); and said combustion pressure sensor (200) according to any one of claims 1 to 4,
   wherein said pressure transmitting members (210, 30) of said combustion pressure sensor (200) constitutes said center shaft (30); said pressing portion is disposed at a rear end side of said center shaft; said supporting portion (250) is disposed at a rear end side of said main metal fitting (40) in a state where said supporting portion (250) accommodates within in itself said pressing portion (212), said piezoelectric elements (240, 245), and said electrodes (230, 235); and said first opening (255) and said second opening (256) are formed in said supporting portion (250).

6. A glow plug (500) comprising:
   a main metal fitting (540) formed with an axial hole (43) extending along an axis;
   a center shaft (530) passed through said axial hole (43) and held by said main metal fitting (540) so as to be movable along said axial direction;
   a heater member (20) that includes a heat generating body (24) at its top end side and of which a rear end side is fixed to the top end of said center shaft (530); and said combustion pressure sensor (400) according to any one of claims 1 to 4,
   wherein said supporting portion (545) of said combustion pressure sensor (400) is disposed at a rear end side of said main metal fitting (540); said pressure transmitting member (530) constitutes said center shaft (530); said pressing portion (412) is disposed at a rear end side of said center shaft (530) in a state where said pressing member (412) exerts a pre-load to said piezoelectric element (440) with said piezoelectric element (440) interposed between said pressing portion (412) and said supporting portion (545); and said pressing portion (412) is formed with said first opening (455) and said second opening (456).

* * * * *